Patented May 24, 1949

2,470,918

UNITED STATES PATENT OFFICE 2,470,918

METHOD OF IMPREGNATING AND DECORATING CEMENTITIOUS MATERIALS

Ling Chung, New York, N. Y.

No Drawing. Application July 23, 1942, Serial No. 452,029

1 Claim. (Cl. 117—123)

This invention relates to a method of producing intricate artistic and decorative hollow articles or objects or art and has for its primary purpose the faithful reproduction of art objects, museum pieces or specimens and the like in any desired quantity and in durable form, at a comparatively low cost, so that through their faithful reproduction such articles may be made available to the public.

Another object of the present invention is the provision of a method by which durable, faithful reproductions of articles may be made, regardless of the number and depth of under-cuts therein.

A further object of the present invention is the provision by which anything that can be reproduced with plaster of Paris or clay can be transformed into permanent plastic quality, impervious to water, and in permanent coloring true to the coloring of the original or of any desired artistic color scheme.

Another object of the present invention is the provision of molds in which the articles are cast, which molds can be produced cheaply and in a short time, thus permitting the making of reproductions of art objects in small quantities, if desired, without materially increasing the production cost over that for quantity production.

More specifically, the present invention embraces the manufacture of articles as above specified of a plaster of Paris or quick-setting clay base embodying a predetermined quantity of absorbent, fibrous material, such as wood flour, cotton flock, asbestos, paper pulp or the like. The material of which the base is formed is molded to assume the shape of the model or original, and the base is then impregnated with a sirupy liquid binder, such as partially polymerized resin of phenol-formaldehyde, ureaformaldehyde, acrylic and polystyrene resins, either natural or synthetic resins in solvent solution, shellac, degel glue or gum solutions. When glue is used, the dried article should be treated with formaldehyde or chrome alum solution to render it impervious to water. The impregnated article is cured by heat, or by some accelerator added to the binder. The article may be colored in its first tage after it is withdrawn from the mold, with water or alcohol soluble dyes. After it is impregnated with the binder and cured, it may be polished, if desired, and/or it may be sprayed with paint of any composition, since the material of the article, after curing, is still sufficiently porous on the surface to absorb the paint.

A further object of the present invention is to provide a method of pre-forming an article of such substance as quick-setting clay or plaster of Paris, utilizing their expanding properties in their setting stages to take up fine detail of the article being formed (which acquiring of fine detail is impossible when resinous casting compounds are used), then resinifying the article after it is pre-formed and curing the resin saturated article by heat, thereby avoiding the danger of an over-dosage of curing reagent, as is often the result when slushing resinous compounds, which require a relatively large quantity of curing reagents to insure quick-setting, are employed to preserve the shape and configurations of the formed article. An over-dosage of curing reagents, as is well known, results in cracking or checking of the finished article in time, after its forming.

The preferred method embodying the invention will now be described, but it is to be understood that the invention is not to be limited thereto, as various modifications to the same may be made, within the scope of the invention.

In carrying out the method of the present invention, the art object, such as a statue, plaque, jar, or other article which is to be reproduced, is employed as a pattern for making a mold, the specific construction and method of making of which will hereinafter be more specifically described.

After the mold has been formed, the base or main body of the finished article is molded therein, of plaster of Paris, clay of quick depositing quality, quick setting cement, or any suitable substance possessing a setting power of its own after mixing with water, and embodying the inherent feature of taking up the intricate shape of the mold. A certain percentage of fibrous material is preferably added to the filler or base material to increase the absorption properties thereof, such material being wood flour, cotton flock, asbestos, paper pulp or the like. Such absorbent material should be approximately within the range of ten to twenty per cent of the whole mass, to permit the obtaining of a material of proper consistency, when mixed with water, to permit it to assume the intricate shapes of the mold. The proportion or percentage of absorbent material incorporated in the plaster of Paris or quick-setting Chinese clay or other base material may vary according to the purpose of the final product desired.

After the mixture forming the base material is poured into the mold, it is slushed until the desired thickness is obtained, it being understood that for purposes of economy as well as for reducing the weight of the finished article, the reproductions are made hollow. After one or two minutes, or sufficient time to permit setting of the mixture of base material, the article is withdrawn from the mold and it is then dried.

After the molded base has been dried, it is impregnated with a plastic or resin binder in a sirup-like liquid state. Such binder may be partially polymerized resin of phenol-formaldehyde, urea-formaldehyde, acrylic and polystyrene resins, either natural or synthetic resins in solvent solution, or other suitable material.

One such impregnating solution is produced by the reaction of phenol and formaldehyde in the presence of a catalyst, such as potassium and sodium hydroxides, acetic and oxalic acids. Experiments have shown that a proportion slightly in excess of seven molecules of formaldehyde and six molecules of phenol produces the strongest product, but it may be desirable to use approximately equal proportions in molecular weight of both of these ingredients, together with some hardening reagent in the curing stage.

The proportions used for one such impregnating solution found practical are, three kilograms of phenol, two and four-tenths kilograms of forty per cent formaldehyde solution together with two hundred and forty cubic centimeters of potassium hydroxide solution (one to three cc. of water), mixed and heated with a moderate flame until the mixture begins to boil. At the beginning of boiling, resinification starts, and the temperature is then kept at 98° to 100° centigrade for a predetermined time, approximately one and one-half hours, or until the viscosity of the mixture measures up to 24° Baumé, at which time the resin is sufficiently dense for proper impregnation of the molded base. Regulation of the resin content of the impregnated base article may be varied by variation in the viscosity of the impregnating liquid. Thus, if the base article is to have a higher than ordinary resin content for strength and dielectric properties, a more viscous liquid is used, provided by further heating until the desired viscosity is reached. Finally seventy-five grams of hexamine are added to the hot solution, which will dissolve within a few minutes. While resinification is taking place a small amount, say two to five per cent, of glycerine or gelatine may be added to the impregnating solution to give toughness to the final product and also increase the plasticity of the resin, which will minimize the cracking or checking tendency of the article during the curing process.

In instances where the finished article is not intended to be sprayed with paint or other suitable coloring material, an acid catalyst should be used in the preparation of the impregnating solution so as to provide a colorless product which will bring out the coloring of the base article. It is to be understood that the base article may be colored, if desired, before it is impregnated with the resinous impregnating material and after it is withdrawn from the mold, with water or alcohol soluble dies, and it may be colored in its entirety, or only various parts thereof colored as desired. In such instances, the colorless impregnating solution will enhance and bring out the color of the dyed base.

A quantity of the resinous impregnating liquid, the viscosity of which has been brought to the desired degree, sufficient to immerce the entire article to be impregnated, is used, and the process of impregnation is then carried out in any one of a number of suitable methods, preferably in a vacuum pressure kettle, altho impregnation may be provided by merely immersing the article in the resinous impregnating liquid, provided sufficient time is allowed for the absorption, say from twenty-four to forty-eight hours. However, the resin content of an article impregnated by simple immersion has been found to be approximately fifteen to twenty per cent less than the resin content of articles impregnated in a vacuum pressure kettle.

It has been found that a more desirable degree of impregnation by immersion is provided if the article to be impregnated is first heated to a temperature of from 50° to 70° C., to diminish the amount of air within the pores of the article, which is then immediately immersed in the resinous impregnating solution, which has been heated to approximately the same temperature as the article. The article is left in the heated impregnating solution for one or two hours, after which it is cured, and again heated and immersed in the heated impregnating solution. The process of heating, immersing, reheating, and reimmersing is repeated from two to four times until the desired degree of impregnation of the plaster or clay base is obtained, with a period of several hours for curing between each such operation of heating and immersing. In carrying out this immersion process of impregnating, it is preferable to incorporate the hexamine or other hardening reagent with the original clay or plaster in an alcoholic solution.

In utilizing the vacuum pressure method of impregnation, a vacuum pressure kettle of approved type, equipped with its usual accessories such as a vacuum pump, pressure gauge, etc., is employed, with the vacuum pressure pump connected through suitable piping to the top of the kettle. A feed pipe for the impregnating solution is connected to the bottom part of the kettle in such manner that the resin or impregnating liquid will rise slowly into the vacuum kettle, preventing damage to the article to be impregnated. The feeding of the impregnating solution into the top of the kettle and downwardly over the article would in many instances, where the article was of intricate design, rupture or damage the fine and intricate parts of the molded clay or plaster base or body. The clay or plaster base or body is put into a wire bracket with a cover, which is inserted into the kettle and hooked or otherwise tightly held in place within the interior of the kettle, so as to keep the object from moving about, and insuring its complete immersion in the impregnating liquid admitted into the kettle.

After the clay or plaster base or body is placed within the kettle, the kettle is tightly sealed and the air is pumped therefrom until a vacuum of at least twenty-six inches of mercury is reached. The impregnating resinous liquid is then immediately admitted into the kettle through the bottom pipe, and air is pumped into the kettle through the pipe at the top, until the pressure within the kettle reaches approximately 100 to 150 lbs. per square inch. This pressure is maintained in the kettle for a predetermined period of time, usually only a few minutes, after which the pressure is released, the kettle opened, the clay or plaster article, which has thus been thoroughly impregnated with the resinous impregnating solution, is removed. The impregnated clay or plaster object has the surplus impregnating solution then wiped from its outer surface, or the residual solution may be allowed to drain off. The article is then ready for heat curing.

It has been found that satisfactory impregnation of the clay or plaster object may be obtained by pressure. In such method the vacuum pressure kettle is also employed, and instead of using air pressure to force the impregnating solution into the clay or plaster cast base, the impregnating solution is forced into the pressure kettle under pressure created by a suitable pump. The pump creates a pressure upon the impregnating solution of approximately 300 to 400 lbs. per square inch, which is maintained for a few seconds, after which the pressure is released and the impregnated clay or plaster base removed. This method of forcing the impregnating solution into the kettle under pressure requires less time than the vacuum pressure system above described, but it is not as adaptable for use in impregnating articles comprising small, fine and relatively fragile parts, since the quick flow of liquid under pressure is apt to break or injure such parts.

The impregnated article is cured in an oven of approved construction, preferably provided with a revolving shelf therein on which the article may be placed, and in which the desired temperature is maintained, preferably by a thermostatic control of any preferred type such as may be purchased upon the open market. The article to be cured may have many irregular surfaces and uneven thicknesses, and consequently a gradual rise of temperature in the heated curing oven is essential. After the article is placed in the curing oven, the temperature therein is gradually brought to approximately 60° centigrade, and maintained at such temperature for approximately twenty-four hours. The oven must be provided with suitable ventilating openings or vents open to atmosphere to permit the escape of the vaporized water and resin from the oven. After the lapse of approximately twenty-four hours at a maintained temperature of 60° centigrade, the temperature within the oven is gradually raised to approximately 85° centigrade and maintained at this temperature for approximately another twenty-four hour period, after which the temperature in the oven is again raised to a temperature of from 100° to 120° centigrade, at which it is maintained for approximately six hours. The impregnated article is then thoroughly and completely cured and has a hard, durable surface which will withstand heavy shocks, and is practically unbreakable under shocks or impacts of the type to which such articles are ordinarily accidentally subjected.

Paint or any suitable coloring material may then be sprayed or otherwise put on the article to provide the desired color effects or to provide an exact reproduction of the original model, if desired. The surface of the cured article will still have sufficient absorbent characteristics to absorb such paint. The physical, chemical and dielectric properties of the finished article are similar to the conventional phenolic molded products.

In order to provide better penetration of the paint or coloring material and a more artistic appearance of the finished article, it is desirable to have the carrying vehicle of the paint of the same material as the impregnating solution, giving the paint or coloring material and the surface of the article an affinity for each other. In instances where paint is to be hardened by heat, the paint should be applied to the article when it is only half cured, or, say, after the first twenty-four hour period in the curing oven. The further curing of the article by heat will thus also serve to harden the paint and also weld it to the article permanently.

While the foregoing specific description of the method relates specifically to the use of a phenol-formaldehyde impregnating solution or liquid, it is to be understood that the impregnation of the cast plaster or clay base may be provided in substantially the same series of steps when using other resinous materials as hereinbefore described, the variations in the steps of forming the resinous impregnating solution being varied only as required by the particular type of resin employed.

In the reproduction of large pieces wire, metal rods or the like may be imbedded within the plaster or clay cast base as it is being cast, to provide strengthening reinforcemets therefor.

The molds employed in the casting of the articles are made in much the same manner in which the articles themselves are made. That is, the object to be reproduced or the master model is employed, a split mold of the required number of parts being built around it with plaster of Paris or a quick-setting clay, and the set of molds, or all the parts of the mold, are impregnated with the impregnating solution, cured, and thus rendered impervious, in the same method and with the same apparatus as described heretofore for making the articles themselves. By constructing the molds in this manner, the result is a durable and practically unbreakable mold the surface of which is such that the base or body cast therein may be easily removed therefrom, thus eliminating the necessity of treating the interior of the mold with soap solution as is usual to facilitate removal of the castings. The presence of soap in the cast article, which it would absorb from the mold, would have damaging effects on the properties of the binding resins and also would tend to seal the pores of the casting and prevent complete impregnation thereof with the impregnating resinous solution.

From the foregoing description it will be apparent that by the present method practically any article which can be reproduced in plaster of Paris or a quick-setting clay may be reproduced in an artistic, durable and faithful form, and at comparatively low cost, in any quantity desired. The process is adaptable for the reproduction of art objects, museum specimens of biological and anatomical character, art motifs of advertising character, window display models, artistic signs, and even shop fronts and the like.

While certain preferred ways of practicing the principles of the present invention are described herein, it is to be understood that the invention is not to be restricted thereto, since the steps of the method or process may be varied within the scope of the appended claim.

What is claimed:

The method of producing art objects or the like which consists in impregnating a body of porous cementitious material with a viscous resinous impregnating solution, placing the impregnated body in a curing oven and gradually raising the temperature in the oven to approximately 60° centigrade, maintaining the oven temperature at approximately 60° centigrade for a predetermined length of time, removing the impregnated body from the oven and applying heat hardening coloring paint to the body, returning the body to the oven and gradually raising the temperature in the curing oven to approximately 85° centigrade, maintaining the oven at such temperature for a predetermined length of time, gradually raising the temperature of the oven to 100° to 120° centigrade and maintaining such temperature in the oven for a predetermined length of time, and then removing the cured impregnated body from the curing oven.

LING CHUNG.

REFERENCES CITED

The following references are of record in the file of this patent:

UNITED STATES PATENTS

| Number | Name | Date |
|---|---|---|
| 1,160,363 | Baekeland | Nov. 16, 1915 |
| 1,729,056 | Texier | Sept. 24, 1929 |
| 1,729,057 | Texier | Sept. 24, 1929 |
| 1,741,477 | Pfiffner | Dec. 31, 1929 |
| 1,776,622 | Errington et al. | Sept. 23, 1930 |
| 1,902,627 | Elbogen | Mar. 21, 1933 |
| 2,288,633 | Luckhaupt | July 7, 1942 |